Feb. 23, 1937. H. G. AXTMANN 2,071,606

BRAKE

Filed Jan. 12, 1934 4 Sheets-Sheet 1

INVENTOR.
HAROLD G. AXTMANN
BY
ATTORNEY

Feb. 23, 1937.　　　　　H. G. AXTMANN　　　　　2,071,606
BRAKE
Filed Jan. 12, 1934　　　　　4 Sheets-Sheet 2

INVENTOR.
HAROLD G. AXTMANN
BY
ATTORNEY

Feb. 23, 1937.  H. G. AXTMANN  2,071,606
BRAKE
Filed Jan. 12, 1934  4 Sheets-Sheet 3

INVENTOR.
HAROLD G. AXTMANN
BY
ATTORNEY

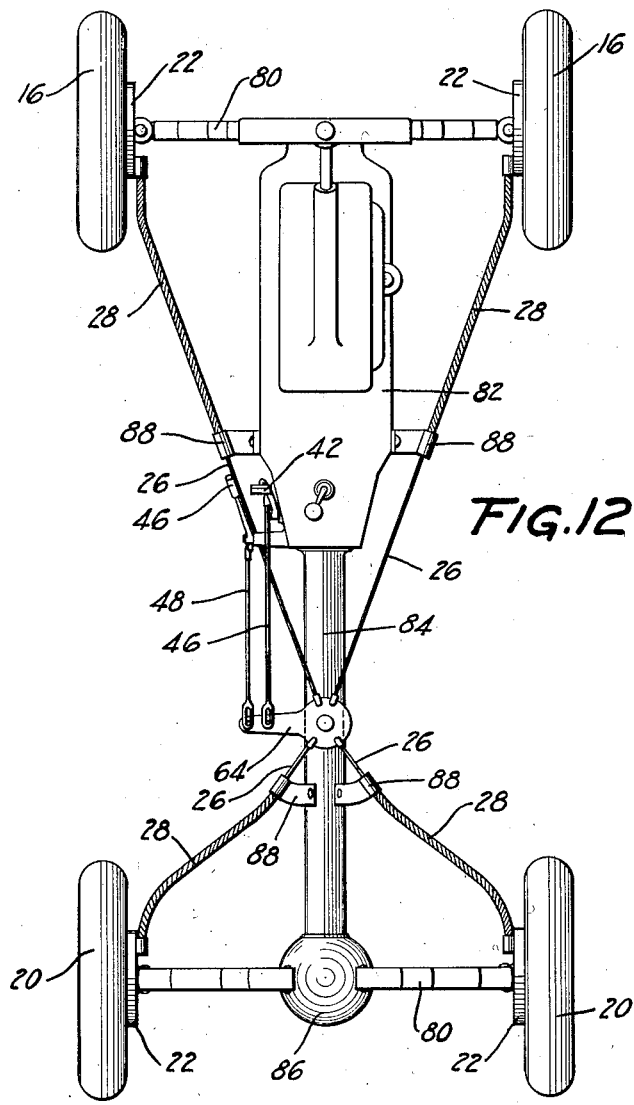

Patented Feb. 23, 1937

2,071,606

UNITED STATES PATENT OFFICE 2,071,606

BRAKE

Harold G. Axtmann, South Bend, Ind., assignor to Bendix Aviation Corporation, South Bend, Ind., a corporation of Delaware Application January 12, 1934, Serial No. 706,355

6 Claims. (Cl. 188—10)

This invention relates to brakes, and is illustrated as embodied in four wheel automobile brake systems. An object of the invention is to provide a simple and inexpensive mechanical "hookup" or linkage for applying a set of four brakes, preferably alternatively either by pedal or hand lever, and which may be so constructed and so arranged that even considerable damage (such as breaking the connection to one of the brakes) will in no case put the entire system out of commission.

Various features of novelty relate to bringing together at the center of the vehicle, for operation by a novel, simple and compact device connected to the pedal and hand lever, the four cables which pass to the four brakes through flexible Bowden-type conduits, both as to the general arrangement of the parts of such a hookup and as to the particular construction and arrangement of the device for operating the cables.

The above and other objects and features of the invention, and various novel combinations of parts and desirable particular constructions, will be apparent from the following description of the illustrative embodiments shown in the accompanying drawings, in which:

Figure 12 is a plan view of a chassis embodying a modification like that of Figure 8, except that the central lever is mounted on the torque tube.

Figure 1:
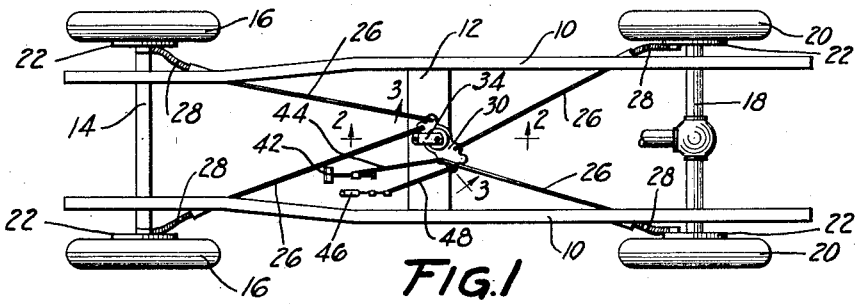
Figure 1 is a top plan view of an automobile chassis having one form of the novel brake-operating hookup.

The chassis illustrated in Figure 1 has a frame including side members 10 and one or more cross members 12, supported by the usual leaf springs or otherwise upon a front axle 14 having road wheels 16 swiveled thereto and upon a rear axle 18 having road wheels 20.

Each of the four wheels has a brake, more particularly described below, which has a drum 22 rotating with the wheel and which, with a stationary support such as a backing plate defines a brake chamber which houses the friction means of the brake. Each brake is operated by a flexible tension element such as a cable 26 which passes through the backing plate, and through a flexible Bowden-type conduit 28 forming in effect a flexible extension of the brake chamber and which is supported at one end by the backing plate and at the other end by the adjacent side frame member 10.

Figure 2:
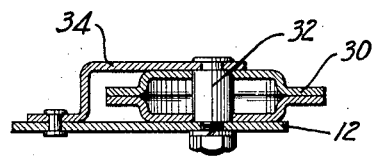
Figure 2 is a partial section on the line 2—2 of Figure 1, and showing the construction and mounting of the central brake-operating lever.
Figure 3:
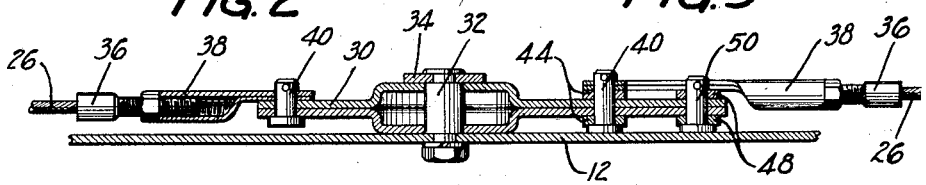
Figure 3 is a partial section on the line 3—3 of Figure 1, showing the connections to the lever.

In the arrangement of Figures 1-3, the four cables 26, passing out of their conduits 28 substantially in alignment with the axes of the conduits at their ends, are all inclined so that they are brought together substantially at the center of the chassis, where they are all connected to an operating member 30. The member 30 is made by welding together face to face two steel stampings, to form a lever movable in a horizontal plane about a vertical axis defined by a pivot 32 arranged centrally of the lever and supported at its lower end by the cross member 12 and at its upper end by a bracket 34 secured to the cross member 12.

Each of the cables 26 has at its end a fitting 36 adjustably threaded into a tube part 38, the other end of which is flattened and connected by a pivot 40 to the lever 30. A pedal 42 is connected by a link or cable 44 to one of the pivots 40, while a hand lever 46 is separately connected to the lever 30 by a link or cable 48 and a pivot 50.

Figure 5:
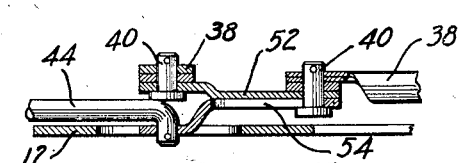
Figure 5 is a partial section on the line 5—5 of Figure 4, showing some of the connections to the central lever.
Figure 4:
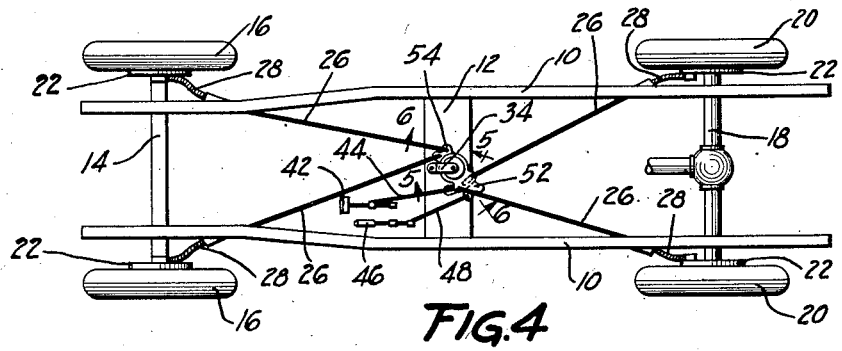
Figure 4 is a plan view of a chassis having a modified hookup arrangement.
Figure 6:
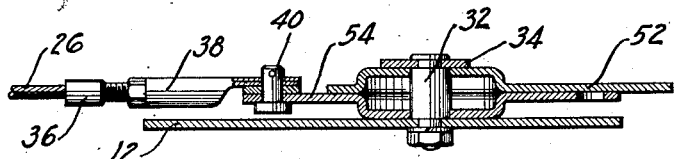
Figure 6 is a partial section on the line 6—6 of Figure 4, showing others of the connections.

In Figures 4-6, the central horizontal lever is made up of upper and lower stampings 52 and 54 welded together. The two front brake cables 26 and the hand lever connection 48 (in this case a link having a bent end to serve as a pivot) are connected to the lower stamping 54, while the two rear brake cables 26 and the pedal connection 44 are connected to the upper stamping 52.

In both of the above arrangements, the center portions of the lever stampings are spaced apart to give spaced bearings engaging the fulcrum pivot 32 some distance apart.

Figure 7:
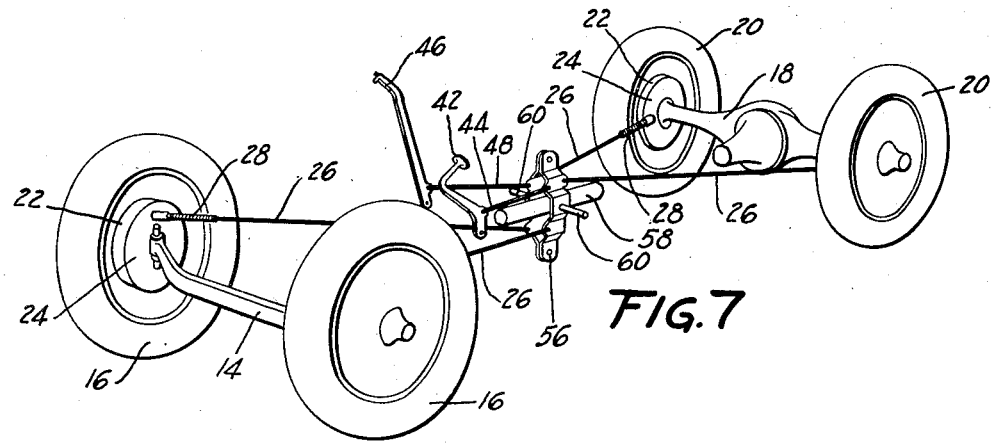
Figure 7 is a perspective and diagrammatic view of a chassis having another modified arrangement.

In Figure 7, the four cables 26 are connected to a vertical lever formed of two stampings 56 secured together at their upper and lower ends and spaced apart between their ends to give ample clearance for a propeller shaft 58. The stampings have aligned coaxial horizontal pivots 60 on opposite sides of the propeller shaft. The pedal 42 is connected to one of the stampings, to which are also connected the left front and rear brake cables 26, and the hand lever 46 is connected to the other stamping, to which are also connected the right front and rear brake cables 26. Whereas the arrangement of Figure 4 gives front and rear independent brake systems interconnected by welding together two lever stampings, Figure 7 shows right and left independent systems interconnected by welding together two lever stampings.

Figure 8:
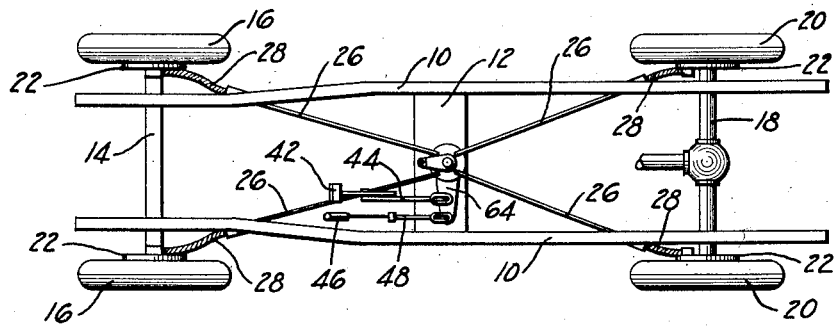
Figure 8 is a plan view of a chassis embodying another modification of the hookup.

In Figure 8 all four brakes are operated by a single horizontal lever 64 having lost-motion one-way connection with both the pedal and the hand lever.

Figure 9:
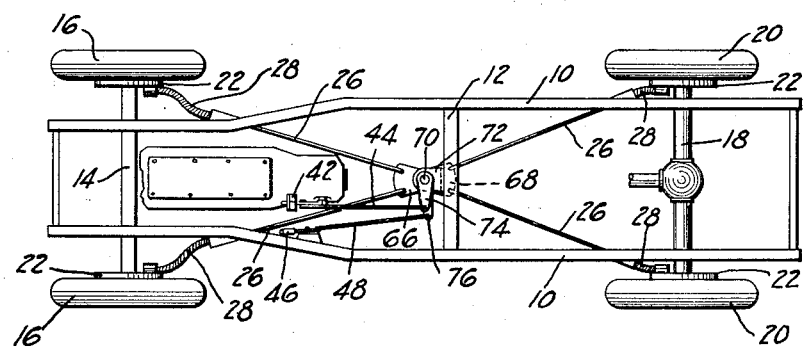
Figure 9 is a plan view of a chassis embodying still another modification of the hookup.
Figure 10:
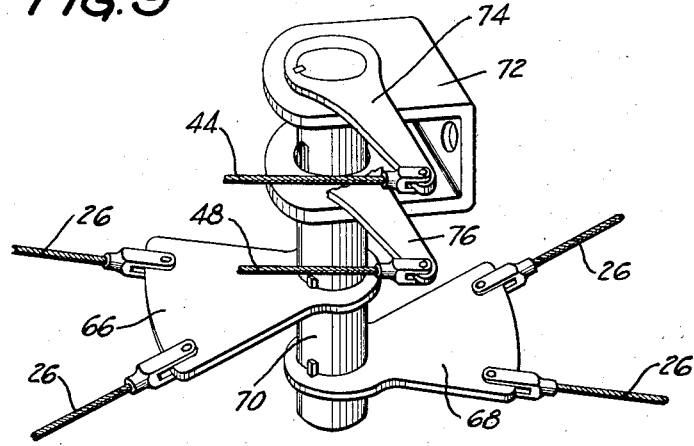
Figure 10 is a perspective view of the centrally-arranged device which operates the four brake cables in Figure 9.

In Figures 9 and 10, the front brake cables 26 are connected to one stamped steel lever 66 and the rear cables 26 to another similar lever 68. Both levers are keyed to a short vertical shaft 70 journaled in spaced bearings formed by the sides of a channel-shaped bracket 72 carried by the cross member 12. The pedal connection 44 is connected to an arm 74 keyed to the shaft between the two bearings, while the lever connection 48 is connected to an arm 76 keyed to the shaft above both of the bearings.

Figure 11:
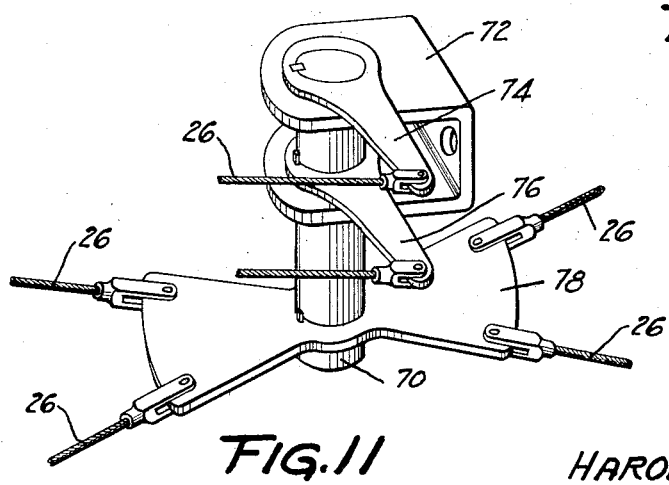
Figure 11 is a perspective view showing a modification of the device of Figure 10.

Figure 11 shows a modification in which all four brakes are applied by a single horizontal lever 78 keyed to the shaft 70.

Figure 12 illustrates a possible arrangement for a vehicle having individually-sprung wheels, illustrated as including suitable transverse leaf springs 80 forming substitutes for the usual axles and supporting a rigid longitudinal unit comprising a unit power plant 82, a torque tube 84 housing the propeller shaft, and a differential 86 through which the rear wheels are driven.

In this case the rear ends of the conduits 28 for the front brakes are supported by brackets 88 carried by the power plant unit, and the front ends of the conduits 28 of the rear brakes are supported on the torque tube 84. The brakes are applied by either the pedal or hand lever connected as in Figure 8 to a lever 64 which, however, is here pivoted on the torque tube 84.

While several illustrative embodiments have been described in detail, it is not my intention to limit the scope of the invention to those particular embodiments, or otherwise than by the terms of the appended claims.

I claim:

1. A vehicle having four brakes and a spring-supported chassis frame, a flexible conduit secured at its end to each of the brakes and secured to the frame at its other end, four cables, one passing through each conduit and arranged to operate the corresponding brake, the cables beyond the conduits being arranged at acute angles to the center line of the vehicle substantially in prolongation of the axes of the conduits and having their ends arranged adjacent each other approximately at the center of the vehicle, a driver-operated device angularly movable about a vertical axis and connected to said ends of the cables, and a pedal and a hand lever connected to said device and alternatively operable to actuate it to apply the brakes.

2. Brake-operating means comprising a lever including a pair of stampings secured together at their ends, pivot means engaging the stampings approximately centrally of the lever, four brake connections connected to said lever at different points about the axis of the pivot means, and a pedal and a lever connected to the lever at different points.

3. Brake-operating means comprising a lever including a pair of stampings secured together at their ends, pivot means engaging the stampings approximately centrally of the lever, four brake connections connected to said lever at different points about the axis of the pivot means, and a pedal and a lever connected to different ones of the stampings.

4. Brake-operating means for a vehicle having a propeller shaft, comprising a pair of generally vertical stampings having their centers spaced apart and provided with aligned horizontal pivots on opposite sides of the propeller shaft and having their upper and lower ends secured together above and below the propeller shaft to form a centrally pivoted brake lever, and brake-actuating members connected to said lever.

5. Brake-operating means for a vehicle having a propeller shaft, comprising a pair of generally vertical stampings having their centers spaced apart and provided with aligned horizontal pivots on opposite sides of the propeller shaft and having their upper and lower ends secured together above and below the propeller shaft to form a centrally pivoted brake lever, brake-actuating members connected to said lever, and a pedal and a lever connected respectively to different ones of said stampings.

6. Brake-operating means comprising a vertical shaft having vertically-spaced bearings and having four brake connections leading therefrom, and pedal and lever connections for said shaft, one of which is arranged between said bearings and the other of which is arranged at one side of both bearings.

HAROLD G. AXTMANN.